(12) United States Patent
Jiang (10) Patent No.: US 6,902,669 B2
(45) Date of Patent: Jun. 7, 2005

(54) FILTER CARTRIDGE WITH FLOATING SEAL

(75) Inventor: Zemin Jiang, Cookeville, TN (US)

(73) Assignee: Fleetguard, Inc., Nashville, TN (US)

( * ) Notice: Subject to any disclaimer, the term of this patent is extended or adjusted under 35 U.S.C. 154(b) by 102 days.

(21) Appl. No.: 10/243,361

(22) Filed: Sep. 13, 2002

(65) Prior Publication Data

US 2004/0050766 A1 Mar. 18, 2004

(51) Int. Cl.$^7$ .................. B01D 27/00; B01D 27/08; B01D 35/00; B01D 35/30
(52) U.S. Cl. .................. 210/232; 210/238; 210/440; 210/450; 210/493.2; 210/541; 210/542
(58) Field of Search .................. 210/232, 238, 210/440, 450, 493.2, 541, 542, 184, 186

(56) References Cited

U.S. PATENT DOCUMENTS

| | | |
|---|---|---|
| 2,168,125 A | 8/1939 | Hum |
| 2,533,192 A | 12/1950 | Kennedy |
| RE23,604 E | 12/1952 | Schultz .................. 210/183 |
| 2,822,201 A | 2/1958 | Wood |
| 3,319,791 A | 5/1967 | Horne .................. 210/234 |
| 3,767,054 A | 10/1973 | Farrow et al. .................. 210/232 |
| 3,899,425 A * | 8/1975 | Lewis .................. 210/206 |
| 3,959,147 A | 5/1976 | Oakley et al. .................. 210/323 |
| 3,996,137 A | 12/1976 | Cooper .................. 210/130 |
| 4,091,265 A | 5/1978 | Richards et al. .................. 219/501 |
| 4,293,425 A * | 10/1981 | Price .................. 210/754 |
| 4,372,260 A | 2/1983 | Baker |
| 4,648,372 A | 3/1987 | Michaud et al. |
| 4,664,088 A | 5/1987 | Cantoni |
| 4,915,831 A | 4/1990 | Taylor .................. 210/232 |
| 5,084,170 A | 1/1992 | Janik et al. .................. 210/232 |
| 5,211,846 A | 5/1993 | Kott et al. .................. 210/232 |
| 5,342,511 A | 8/1994 | Brown et al. .................. 210/137 |
| 5,354,464 A | 10/1994 | Slovak et al. .................. 210/240 |
| 5,374,355 A | 12/1994 | Habiger et al. .................. 210/440 |
| 5,527,463 A | 6/1996 | Morgan, Jr. .................. 210/450 |
| 5,545,322 A | 8/1996 | Cheng .................. 210/440 |
| 5,556,542 A | 9/1996 | Berman et al. .................. 210/232 |
| 5,601,717 A | 2/1997 | Villette et al. .................. 210/493.1 |
| 5,753,117 A | 5/1998 | Jiang .................. 210/232 |
| 5,832,902 A | 11/1998 | Davis et al. |
| 5,891,336 A | 4/1999 | Vijlee .................. 210/440 |

(Continued)

FOREIGN PATENT DOCUMENTS

| | | | |
|---|---|---|---|
| DE | 3405719 | 8/1985 | .......... B01D/46/06 |
| EP | 1 008 375 A1 | 6/2000 | |
| GB | 912352 | 11/1960 | |
| GB | 1066341 | 4/1964 | |
| JP | 58-131117 | 8/1983 | .......... B01D/46/24 |
| WO | WO 01/85304 A1 | 11/2001 | |
| WO | WO 03/043714 A1 | 5/2003 | |

Primary Examiner—Thomas M. Lithgow
(74) Attorney, Agent, or Firm—Woodard, Emhardt, Moriarty, McNett & Henry LLP (57) ABSTRACT

A filter cartridge includes a filter element that is adapted to filter fluid. The filter element defines a center post cavity constructed and arranged to receive a center post. The filter element has a first end and a second end. A first end plate is attached to the first end of the filter element. The first end plate defines a first end plate opening. A second end plate is attached to the second end of the filter element. The second end plate defines a second end plate opening. A seal is positioned in the second end plate opening to seal around the center post. A floating seal assembly is received in the first end plate opening to seal around the center post. The floating seal assembly includes a gasket and a gasket retainer. The gasket retainer retains the gasket against the first end plate to seal around the center post.

25 Claims, 11 Drawing Sheets

U.S. PATENT DOCUMENTS

| | | | |
|---|---|---|---|
| 5,919,362 A | 7/1999 | Barnes et al. | 210/232 |
| 5,951,862 A | 9/1999 | Bradford | 210/305 |
| 6,174,438 B1 | 1/2001 | Hodgkins et al. | 210/315 |
| 6,199,542 B1 * | 3/2001 | McKay | 123/557 |
| RE37,165 E | 5/2001 | Davis | 210/86 |
| 6,235,194 B1 | 5/2001 | Jousset | 210/206 |
| 6,238,554 B1 * | 5/2001 | Martin et al. | 210/109 |
| 6,328,889 B1 | 12/2001 | Bradford | 210/308 |
| 6,398,838 B1 | 6/2002 | Kaffenberger | 55/498 |
| 2002/0043491 A1 | 4/2002 | Janik et al. | 210/249 |

\* cited by examiner

FILTER CARTRIDGE WITH FLOATING SEAL

BACKGROUND OF THE INVENTION

The present invention generally concerns a filter cartridge, and more specifically, but not exclusively, concerns a filter cartridge that has a floating seal.

In typical fuel filter systems, a filter cartridge, which is used to filter the fuel, is received around a center post. Generally, the filter cartridge has a cylindrical shape and has a filter element with end plates at opposite ends. In some cartridge designs, both end plates have openings through which the center post extends. O-ring gaskets are usually fitted in the openings in order to form a seal around the center post. A gap between the gaskets and the center post may occur if the openings in the top and bottom end plates are not properly aligned with one another and/or if the center post is misaligned, thereby creating leakage around the gaskets. The openings formed in the top and bottom end plates are usually not oriented concentrically with respect to one another. Most gasket designs have limited compression capabilities for handling component misalignment. As a result, off the shelf gaskets are unable to seal consistently around the center post.

Therefore, there has been a need for an improved filter cartridge design that is able to properly seal and compensate for misalignment between the end plates and the center post.

SUMMARY OF THE INVENTION

One form of the present invention concerns a filter assembly that includes a post and a filter cartridge received around the post. The filter cartridge includes a filter element to filter a fluid. An end plate is positioned at one end of the filter element, and the end plate defines an opening. A floating seal assembly is positioned proximal the opening in the end plate for forming a seal between the post and the end plate. The floating seal assembly includes a retainer that seals around the post. The retainer has a flange extending from the retainer. A gasket seals against the flange and the end plate.

Another form of the present invention concerns a filter cartridge. The filter cartridge includes a filter element to filter fluid. The filter element defines a post cavity constructed and arranged to receive a post, and the filter element has a first end and a second end. A first end plate is attached to the first end of the filter element, and the first end plate defines a first end plate opening. A second end plate is attached to the second end of the filter element, and the second end plate defines a second end plate opening. A floating seal assembly is positioned proximal the first end plate opening to seal around the post. The floating seal assembly includes a gasket, and a gasket retainer coupled to the first end plate. The gasket retainer defines a post opening in which the post is received. The gasket retainer has a flange to retain the gasket against the first end plate to seal around the post.

A further form of the present invention concerns a floating seal assembly. The floating seal assembly includes a clip adapted to secure the retainer to an end plate of a filter cartridge. A flange radially extends from the clip, and the flange defines a post cavity adapted to seal around a post. A gasket is disposed on the flange around the post opening.

Further forms, objects, features, aspects, benefits, advantages, and embodiments of the present invention shall become apparent from the detailed description and drawings provided herewith.

DESCRPITION OF THE SELECTED EMBODIMENTS

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Figure 1:
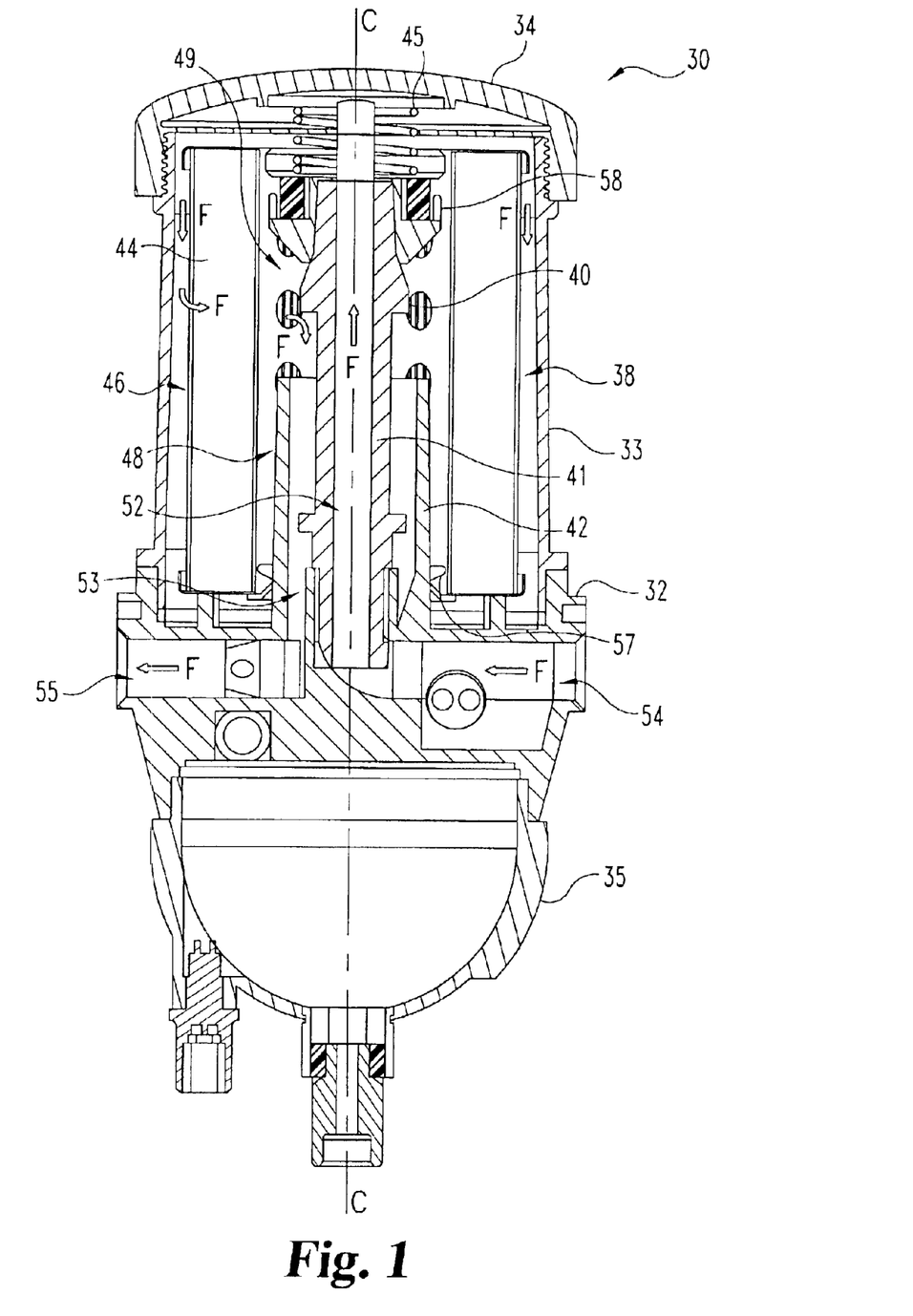
FIG. 1 is a cross sectional view of a filter assembly according to one embodiment of the present invention.

A filter assembly 30 according to one embodiment (among others) of the present invention is illustrated in FIG. 1. A shown, the filter assembly 30 includes a filter head 32, a housing 33, a cap or lid 34, and a collection bowl 35. In the illustrated embodiment, the housing 33 is threadedly attached to the filter head 32, and the filter housing 33 is clear so that the interior of the fuel filter assembly can be viewed in order to check whether the filter needs to be replaced. In other forms of the present invention, the filter housing 33 can be opaque and/or semi-transparent. As depicted, the housing 33 has a generally cylindrical shape; however, it should be understood that the housing 33 can be shaped differently. At the end of the housing 33, opposite where the housing 33 is attached to the filter head 22, the lid 34 is threadedly engaged with the housing 33. As depicted, the collection bowl 35 in the illustrated embodiment is threadedly coupled to the filter head 32. It should be appreciated that the housing 33 can be attached to the filter head 32, the lid 34 and/or the bowl 35 in other manners and/or selected components can be integrally formed together. The filter assembly 30 in the illustrated embodiment is used for filtering fuel, and the collection bowl 35 is used to collect water that has been filtered from the fuel. As will be appreciated from the discussion below, the present invention can be adapted for use with other types of filtering environments.

Referring to FIG. 1, the filter head 32, housing 33, and cap 34 define a filter cartridge cavity 38. Inside the filter cartridge cavity 38, a dual center post 40 extends from the filter head 32. The dual center post 40 includes an inner center post 41 and an outer center post 42 surrounding the inner center post 41. Although the term "center post" has been used herein, it should be appreciated from the discussion below that one benefit of the present invention is that posts 41 and 42 do not need to be "centered" within the filter cartridge cavity 38. Rather, the floating seal design of the present invention allows a seal to be formed around the dual center post 40 even when the inner center post 41 and/or the outer center post 42 are off-centered with respect to the central, longitudinal axis C of the filter cartridge cavity 38 or misaligned with respect to one another.

A filter cartridge 44, according to one embodiment of the present invention, is received around the dual center post 40. In the illustrated embodiment, the filter cartridge 44 has a generally cylindrical shape. However, it should be appreciated that the filter cartridge 44 can be shaped differently. A spring 45, which is attached to cap 34, presses the filter cartridge 44 against the dual center post 40. As shown in FIG. 1, the filter cartridge 44 subdivides the filter cartridge cavity 38 into an outer cavity 46 and an inner cavity 48. The dual center post 40 is received in a center post cavity 49 that is defined in the filter cartridge 44. The outer cavity 46 is defined by the filter head 32, housing 33, lid 34 and filter cartridge 44. In comparison, the inner cavity 48 is defined by the filter cartridge 44 and the dual center post 40. In FIG. 1, the inner center post 41 has an inner passage 52 that supplies unfiltered fluid to the filter assembly 30. An outer passage 53 in the dual center post 40 is defined between the inner center post 41 and the outer center post 42, through which fluid that has been filtered by the cartridge 44 flows. The filter head 32 has a fluid inlet port 54 that supplies the unfiltered fluid to the inner passage 52. The outer passage 53 is fluidly coupled to an outlet port 55 in the filter head 32 through which the filtered fluid exits the filter assembly 30. As illustrated, the inner passage 52 fluidly couples the fluid inlet port 54 to the outer cavity 46. The outer passage 53 fluidly couples the inner cavity 48 to the outlet port.

In the embodiment illustrated in FIG. 1, the fluid in the filter assembly 30 flows along a flow path that is indicated by arrows F. The unfiltered fluid is supplied by the inlet port 54 in the filter head 32. Next, the unfiltered fluid flows through the inner passage 52 in the inner center post 41. From the inner passage 52, the unfiltered fluid flows into the outer cavity 46. The fluid is then filtered through the filter cartridge 44 and after being filtered, flows into the inner cavity 48. The now filtered fluid flows through outer passage 53 in the dual center tube 40 and is discharged from the outlet port 55.

To prevent unfiltered fluid from circumventing filtration in the filter cartridge 44, the filter cartridge 44 incorporates a pair of seals 57 and 58, which separate and seal the outer cavity 46 from the inner cavity 48. In the illustrated embodiment, seal 57 is a fixed o-ring gasket that seals around the outer center post 42. Seal 58 is a floating seal that seals around the inner center post 41. The floating seal 58 compensates for misalignment between the filter cartridge 44 and the dual post 40. As discussed in detail below, the floating seal 58 further compensates for misalignment of other components, such as for end plate opening misalignment. Although the illustrated filter cartridge 44 has a single floating seal 58, it should be appreciated that the filter cartridge 44 can incorporate dual floating seals 58 in order to better compensate for misalignment of the components in the filter assembly 30. Moreover, the floating seal 58 according to the present invention can also be incorporated into filter designs that do not use a dual center post or only require a single seal around a center post.

Figure 2:
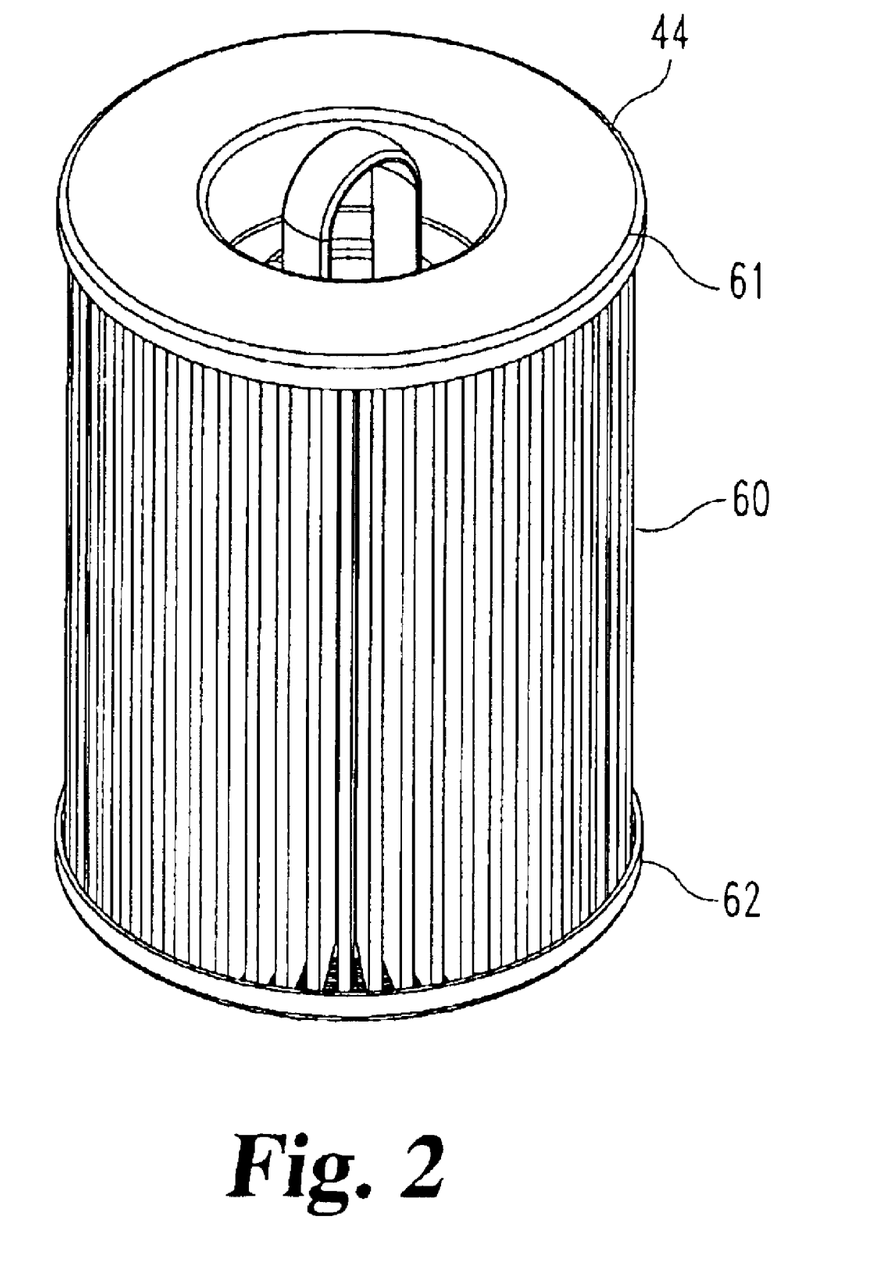
FIG. 2 is a perspective view of a filter cartridge incorporated in the FIG. 1 filter cartridge assembly.
Figure 3:
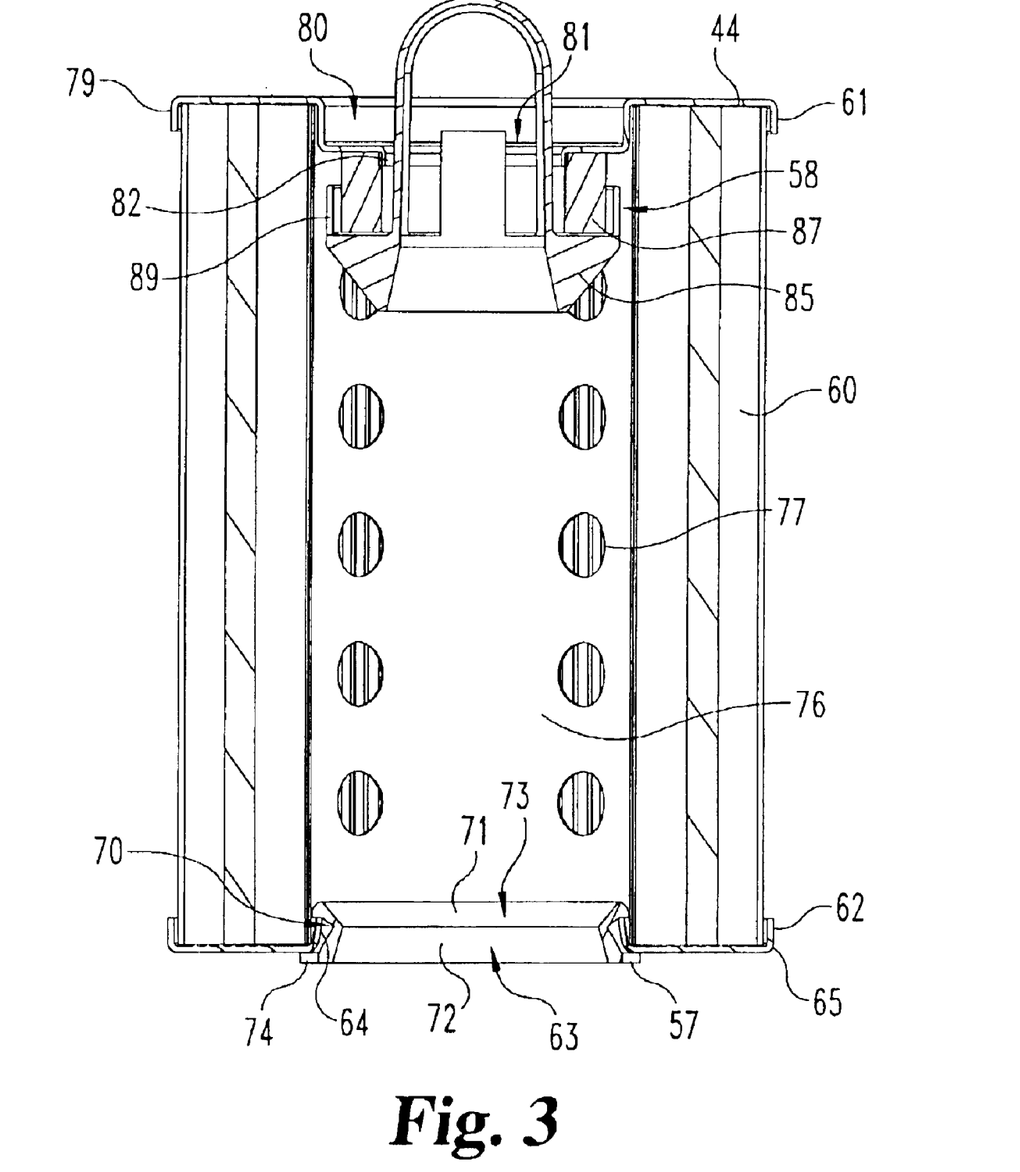
FIG. 3 is a cross sectional view of the FIG. 2 filter cartridge.
Figure 4:
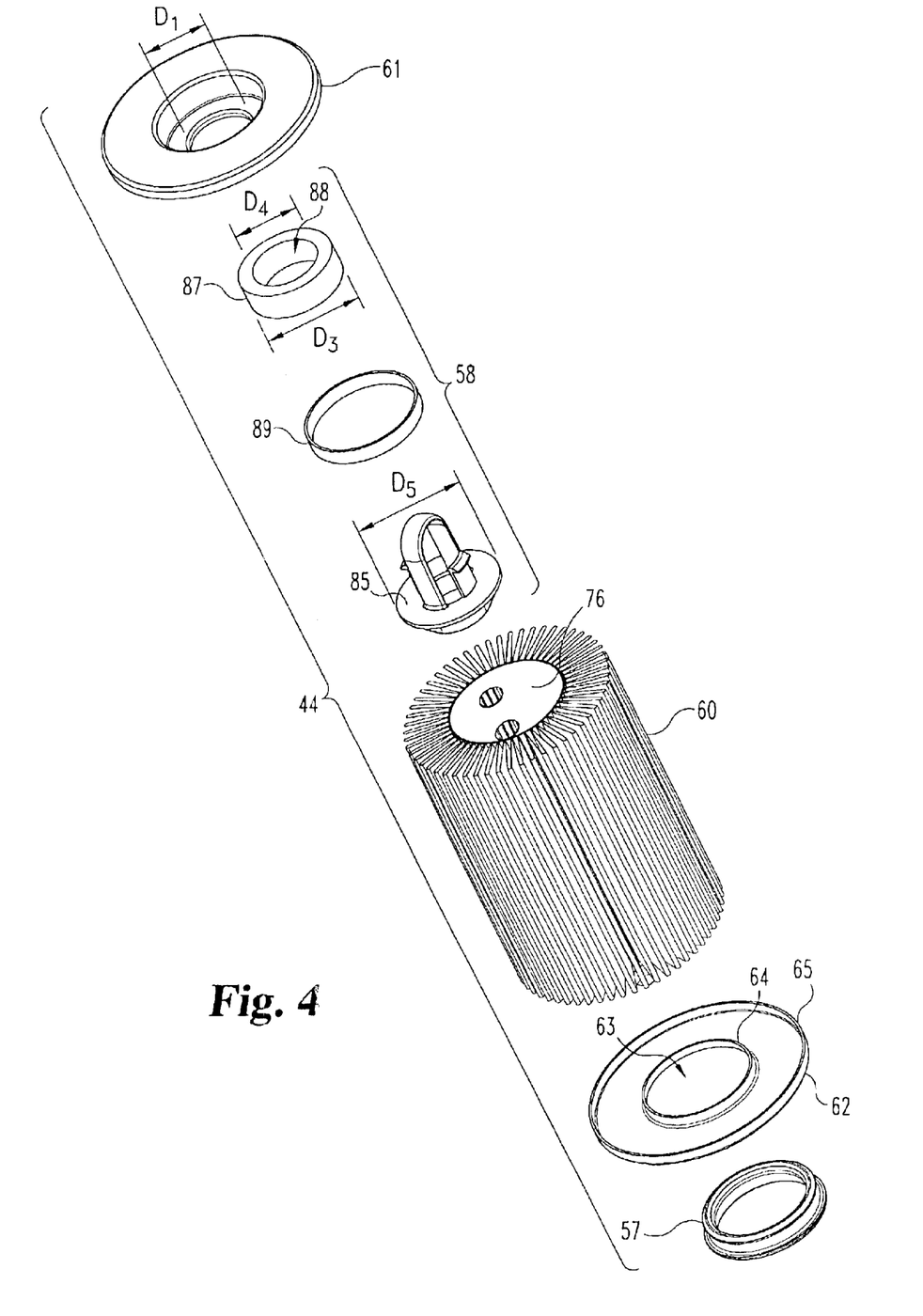
FIG. 4 is an exploded view of the FIG. 2 filter cartridge.

As illustrated in FIGS. 2–4, the filter cartridge 44 according to one embodiment of the present invention includes a filter element or media 60 that is used to filter the fluid. First 61 and second 62 end plates are provided at opposite ends of the filter media 60. The end plates 61, 62 are attached to the filter media 60 in one embodiment through an adhesive. It should be appreciated, however, that the end plates 61, 62 can be attached to the filter media in other generally known manners. As shown in FIG. 3, the second end plate 62 defines a center post opening 63. The second end plate 62 further includes an inner flange 64 that surrounds center post opening 63 and an outer flange 65. The filter media 60 is attached between the inner flange 64 and the outer flange 65. In the illustrated embodiment, the fixed seal 57 is in the form of an O-ring type gasket that is frictionally fitted to the inner flange 64 of the second end plate 62. As shown in FIG. 3, the fixed seal 57 further has a flange recess 70 that allows the fixed seal 57 to be attached to the second end plate 62. The fixed seal 57 further includes a pair of angled surfaces 71 and 72 that form a general hourglass-shape opening 73 in the fixed seal 57. Seal 57 further includes a retainer flange 74 that surrounds opening 73. With continued reference to FIG. 3, a center tube 76 extends inside the center post cavity 49 between the first 61 and second 62 end plates. The center tube 76 is surrounded by the filter media 60, and the center tube 76 defines a plurality of flow openings 77 through which the filter fluid flows.

At the first end plate 61, an outer flange 79 of the first end plate 61 surrounds an end portion of the filter media 60. The first end plate 61 further includes a central recessed portion 80 that surrounds an inner center post opening 81. At the recessed portion 80, the first end plate 61 has an indented shape. As shown, an inner flange 82 on the first end plate 61 surrounds the inner center post opening 81. In the illustrated embodiment, a portion the floating seal 58 is attached to the inner center post opening 81 of the first end plate 61. As depicted in FIGS. 3 and 4, the floating seal 58 includes a gasket retainer or body 85, a gasket 87 with a gasket opening 88, and an outer support member 89. In one embodiment, the gasket 87 is formed from an elastic material, such as rubber, and the gasket retainer 85 is formed from a rigid or semi-rigid material, such as plastic. The gasket 87 in the illustrated embodiment has a rectangular cross sectional shape. However, as should be appreciated, the gasket 87 can have a different cross sectional shape. The gasket retainer 85 is clipped to the first end plate 61, thereby retaining the gasket 87 against the first end plate 61. The outer support member 89 is used to resist radial expansion of the gasket 87. In the illustrated embodiment, the outer support member 89 has a generally cylindrical shape, although other shapes are contemplated in other embodiments. In another embodiment, where the fluid pressure is greater on the outside of the gasket 87, for example if the fluid flow direction is reversed, the support member 89 is positioned inside the gasket 87 to resist inward compression of the gasket 87.

Figure 5:
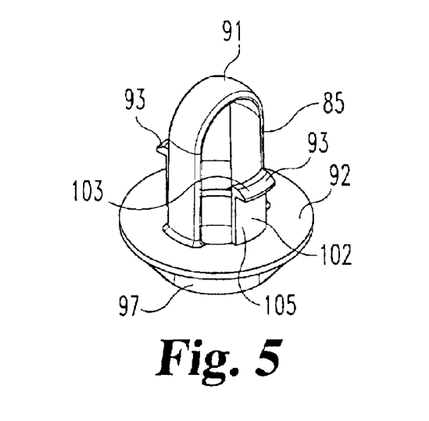
FIG. 5 is a perspective view of a seal retainer incorporated in the FIG. 2 filter cartridge.
Figure 6:
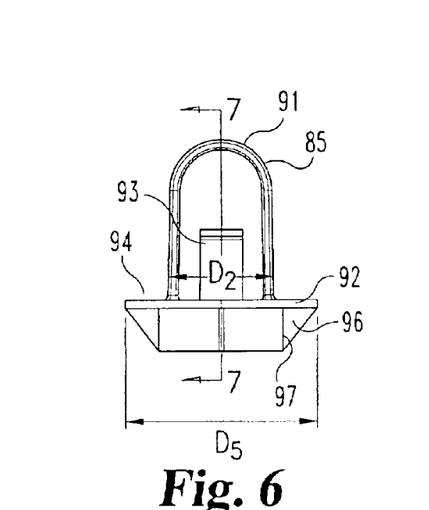
FIG. 6 is a front view of the FIG. 5 seal retainer.
Figure 7:
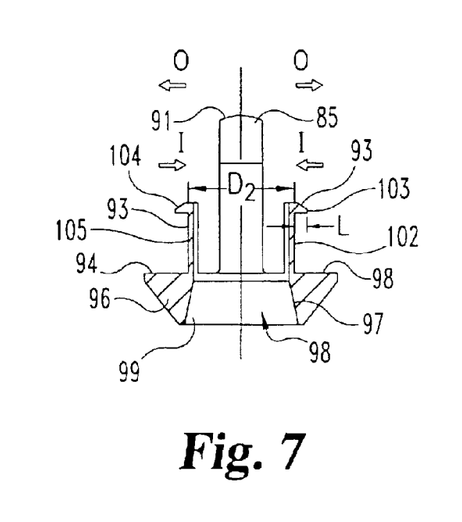
FIG. 7 is a cross sectional view of the FIG. 5 retainer taken along line 7—7 of FIG. 6.

As shown in further detail in FIGS. 5–7, the gasket retainer 85 has a handle member 91 attached to a retainer flange 92. The filter cartridge 44 can be grasped through the handle member 91 such that the cartridge can be easily installed and replaced. The retainer flange 92 supports the gasket 87 and compresses the gasket 87 against the first end plate 61 when the cartridge 44 is installed. In one form of the present invention, the handle member 91 has a generally u-shape, and the retainer flange 92 has a generally circular shape. As shown in FIG. 7, the gasket retainer 85 further includes a pair of oppositely disposed retainer clips 93 that extend parallel to the handle member 91 from the retainer flange 92. The retainer clips 93 secure the floating seal assembly 58 to the first end plate 61, inside center post opening 81. Retainer flange 92 has a gasket contacting surface 94 against which the gasket 87 is retained when the floating seal 58 is assembled. One or more support ribs 96, which radially extend from a support member 97, support the retainer flange 92. In the illustrated embodiment, the gasket retainer 85 has four support ribs 96. However, it should be understood that the gasket retainer 85 can have a different number of support ribs 96. As shown in FIG. 7, the retainer flange 92, along with support member 97, define an inner center post cavity 98 in which the inner center post 41 is received. Inner surface 99 of the center post cavity 98 is constructed to seal against the inner center post 41. As illustrated, the inner center post cavity 98 has a generally frustaconical shape which coincides with the shape of the head of the inner center post 41. The angled inner surface 99 allows the gasket retainer 85 to reposition and align itself with the inner center post 41 when the cartridge 44 is installed.

In the illustrated embodiment, the handle member 91 and the retainer clips 92 together are positioned to have an overall size smaller than the center post opening 81. By member 91 and clips 93 having an overall size that is smaller than center post opening 81, a gap is formed between the gasket retainer 85 and the opening 81 in the first end plate 61 that allows the gasket retainer 85 to radially move within opening 81. Referring to FIG. 7, the retainer clips 93 each include an arm 102 that is attached to the retainer flange 92. Opposite the retainer flange 92, the retainer clip arm 102 has a radially extending head member 103. The arms 102 of the retainer clips 93 are flexible such that the head members 103 are able to be deflected in a radially inward direction I upon insertion of the gasket retainer 85 through opening 81 in the first end plate 61. Head members 103 each have an angled surface 104 that aid in deflecting the arms 102 in a radially inward direction I.

As mentioned above, one factor that allows the floating seal 58 to compensate for misalignment of components is that a gap is formed between the gasket retainer 85 and the center post opening 81, which allows the retainer 85 to move within the opening 81. As depicted in FIG. 5, the arm members 102 and the handle member 91 each have an outer radial surface 105. Referring to FIGS. 4, 6 and 7, diameter D1 (FIG. 4) of the inner center post opening 81 is greater than the diameter D2 (FIGS. 6 and 7) of the outer surfaces 105 such that the retainer clips 93 and handle 91 are able to be received in the inner center post opening 81. The head members 103 extend in a radially outward direction O from the arms 102 in order to engage the first end plate 61 and allow the gasket retainer 85 to float within opening 81. Another related factor that can control how much the gasket retainer 85 is able to float is based on the length L of the head members 103, as measured from the outer surface 105 (FIG. 7). As the length L of the head members 103 becomes longer and the distance D2 between the arms 102 (and handle member 91) can become smaller, such that the floating seal 57 is able to move or float for a greater distance in order to compensate offset components.

The amount the floating seal 58 is able to compensate for component misalignment can also based at least in part on the size of gasket 87. As shown in the FIG. 4 embodiment, the gasket 87 has an outer diameter D3 and an inner diameter D4. The amount of compensation available can depend on the outer diameter D3 of the gasket 87. In the illustrated embodiment, the outer diameter D3 of the gasket 87 is greater than diameter D1 of the center post opening 81 so that a seal can be formed around the center post opening 81 (FIG. 4). Moreover, in this embodiment, the inner diameter D4 of the gasket opening 88 in the gasket 87 is less than the outer diameter D5 of the retainer flange 92 such that a seal can be formed between the gasket 87 and the retainer flange 92. With such a construction, the gasket 87 is able to float and compensate for misalignment of components, while still providing a seal between the first end plate 61 and the gasket retainer 85. In one particular form, the inner diameter D4 of the gasket 87 is greater than both diameter D1 of opening 81 and the overall diameter D2 of the handle 91 as well as the retainer clips 93.

Figure 8:
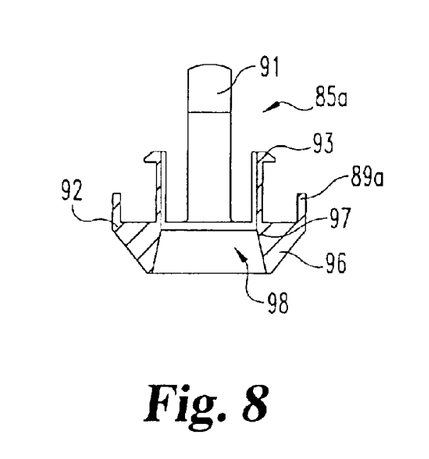
FIG. 8 is a cross sectional view of a seal retainer according to another embodiment of the present invention.

In other embodiments, the clips 93 and the handle member 91 can be optional. In one form, the retainer 85 does not have the clips 93 or the handle member 91. In this form, the retainer 85 is placed over the inner center post 41, the gasket 87 is placed on the retainer surface 98 and the rest of the cartridge 44 slides over the center post 40. The gasket retainer 85 can further be integrally formed with the center post 40. In still yet another embodiment, as illustrated in FIG. 8, gasket retainer 85a has an outer support member 89a integrally formed with the retainer flange 92.

Figure 9:
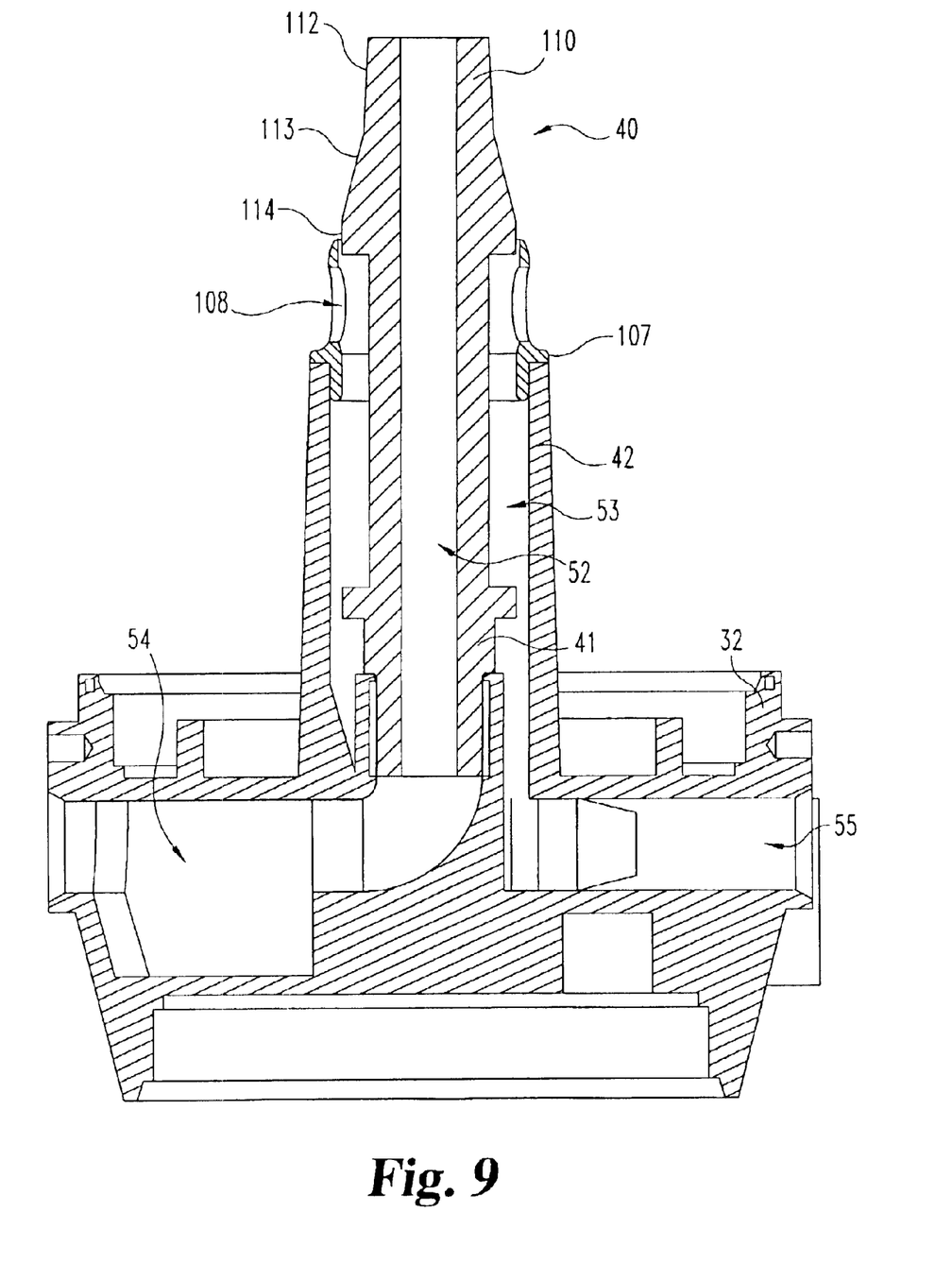
FIG. 9 is a cross sectional view of a center post assembly incorporated in the FIG. 1 filter assembly.
Figure 10:
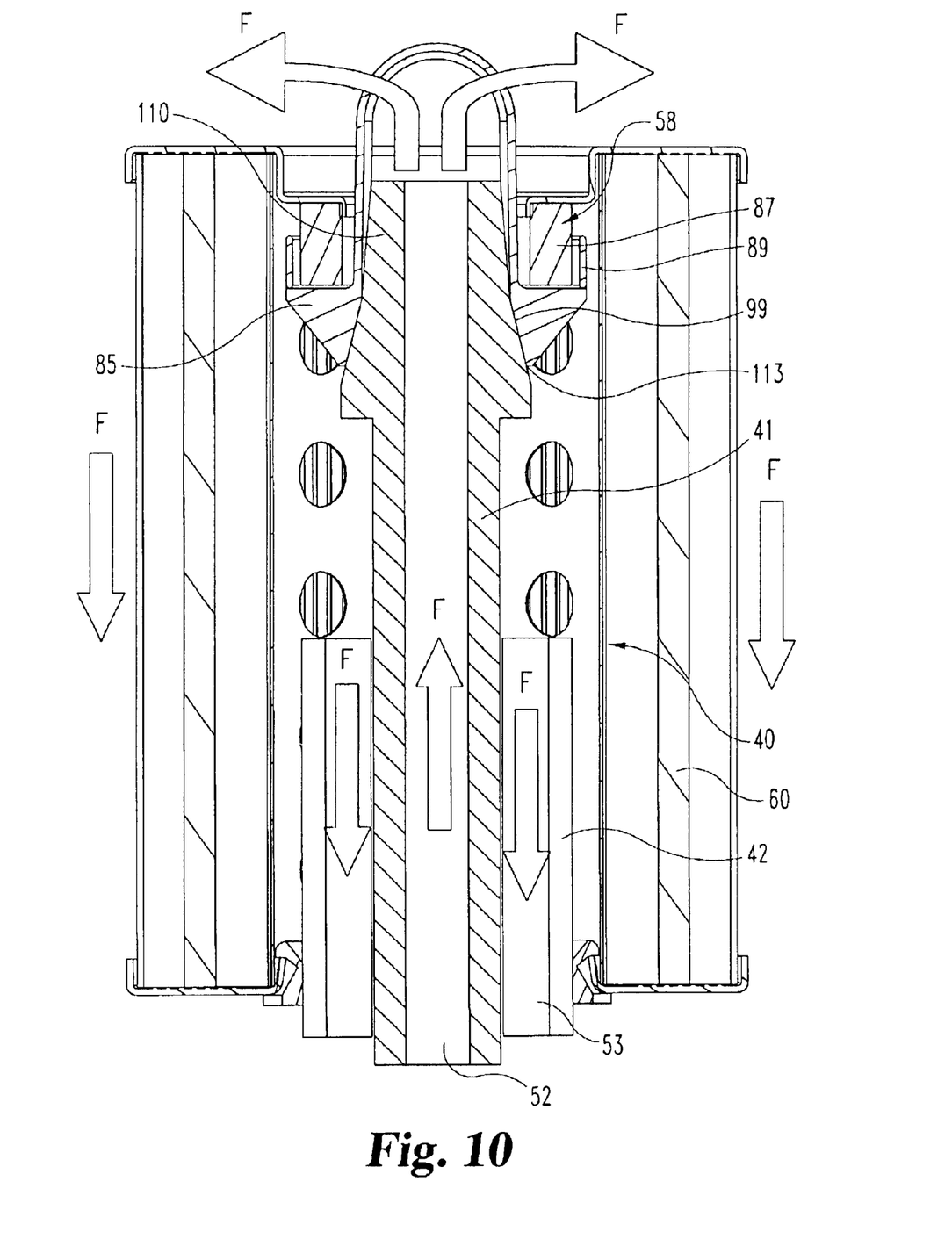
FIG. 10 is a cross sectional view of the FIG. 2 filter cartridge and the FIG. 9 center post.

As illustrated in FIGS. 9–10, the dual center post 40 can further include an outlet cap member 107 that defines a plurality of radially oriented outlet passages 108. As depicted in FIGS. 7 and 9, the inner center post 41 has a head portion 110 that is adapted to be received into cavity 98 in the gasket retainer 85. In FIG. 9, the head portion 110 includes a first generally cylindrical surface 112 as well as an angled or frustaconical surface 113 that spans between the first cylindrical surface 112 and a second cylindrical surface 114. The angled surface 113 on the inner center post 41 and the angled surface 99 in the gasket retainer 85 allow the gasket retainer 85 to align with the inner center post 41, during installation. Once the cartridge 44 is installed, spring 45 presses the cartridge 44 against the dual center post 40, and the floating seal 58 seals around the inner center post 41 at three general locations. At one location, the angled surface 113 of the inner center post 41 seals against the angled surface 99 of the gasket retainer 85. At the other two locations, the gasket 87 of the floating seal 58 forms a seal with the first end plate 61 and the retainer flange 92 of the gasket retainer 85.

Referring to FIGS. 1 and 10, the fluid in filter assembly 30 flows through flow path F in the manner as discussed above. The unfiltered fluid is supplied by inlet port 54 in the filter head 32. The unfiltered fluid then travels through inner passage 52 in the inner center post 41. The unfiltered fluid then flows from the head 110 of the inner center post 41 into the outer cavity 46 of the filter assembly 30. Due to the unfiltered fluid being at a higher pressure than the filtered fluid, the gasket 87 in the floating seal 58 tends to expand in an outward radial direction. The outer support member 89 resists the radial expansion of the gasket 87 during operation. From the outer cavity 46, the fluid then is filtered through the filter media 60 in the filter cartridge 44, flows through the flow openings 77 in the center tube 76, and flows into the inner cavity 48. Water that has been filtered from the fluid by filter media 60, is collected in collection bowl 35. The now-filtered fluid then flows through the outer passage 53 in the outer center post 42 and out the outlet port 55 in the filter head 32.

Figure 11:
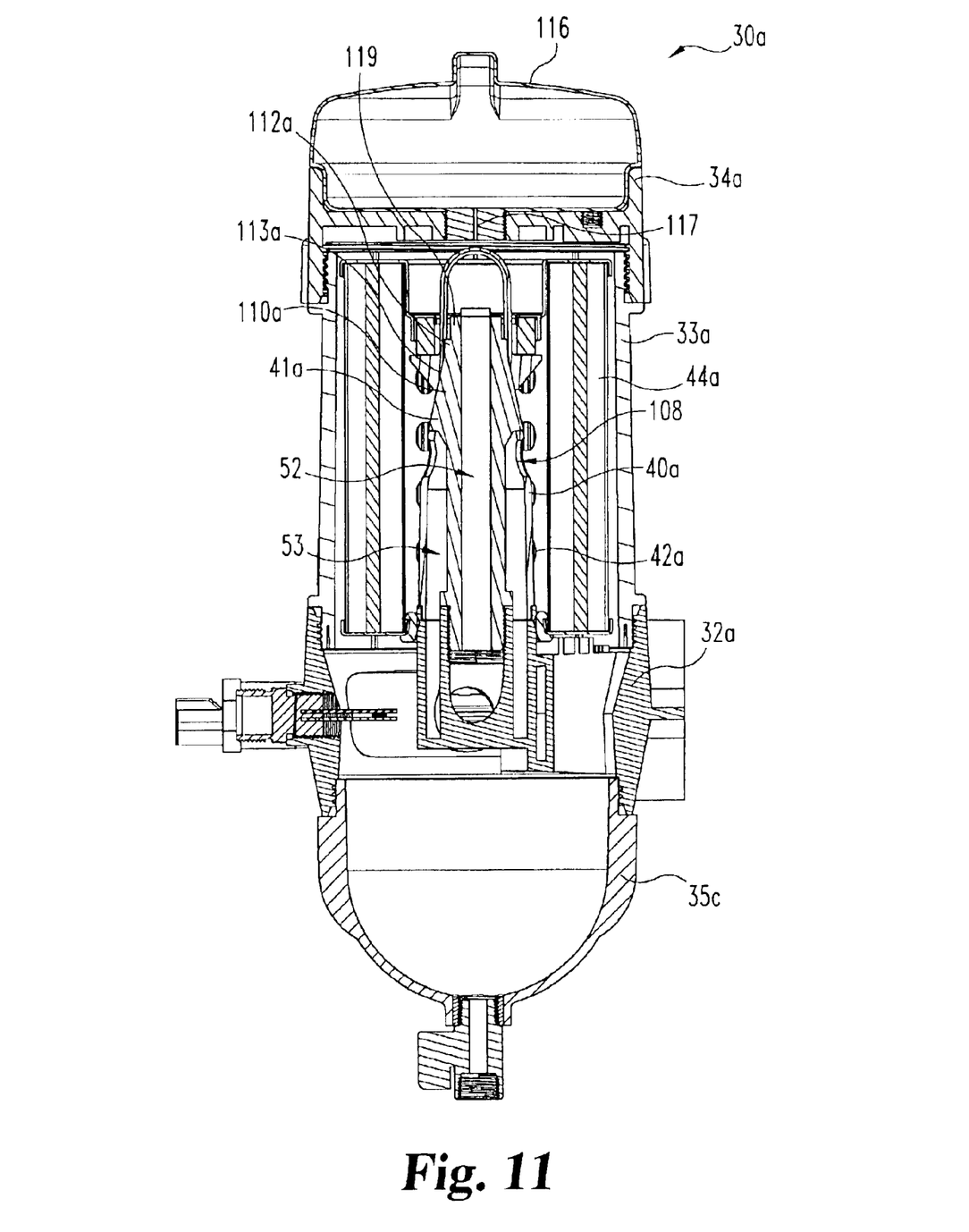
FIG. 11 is a cross sectional view of a filter cartridge assembly according to another embodiment of the present invention.
Figure 12:
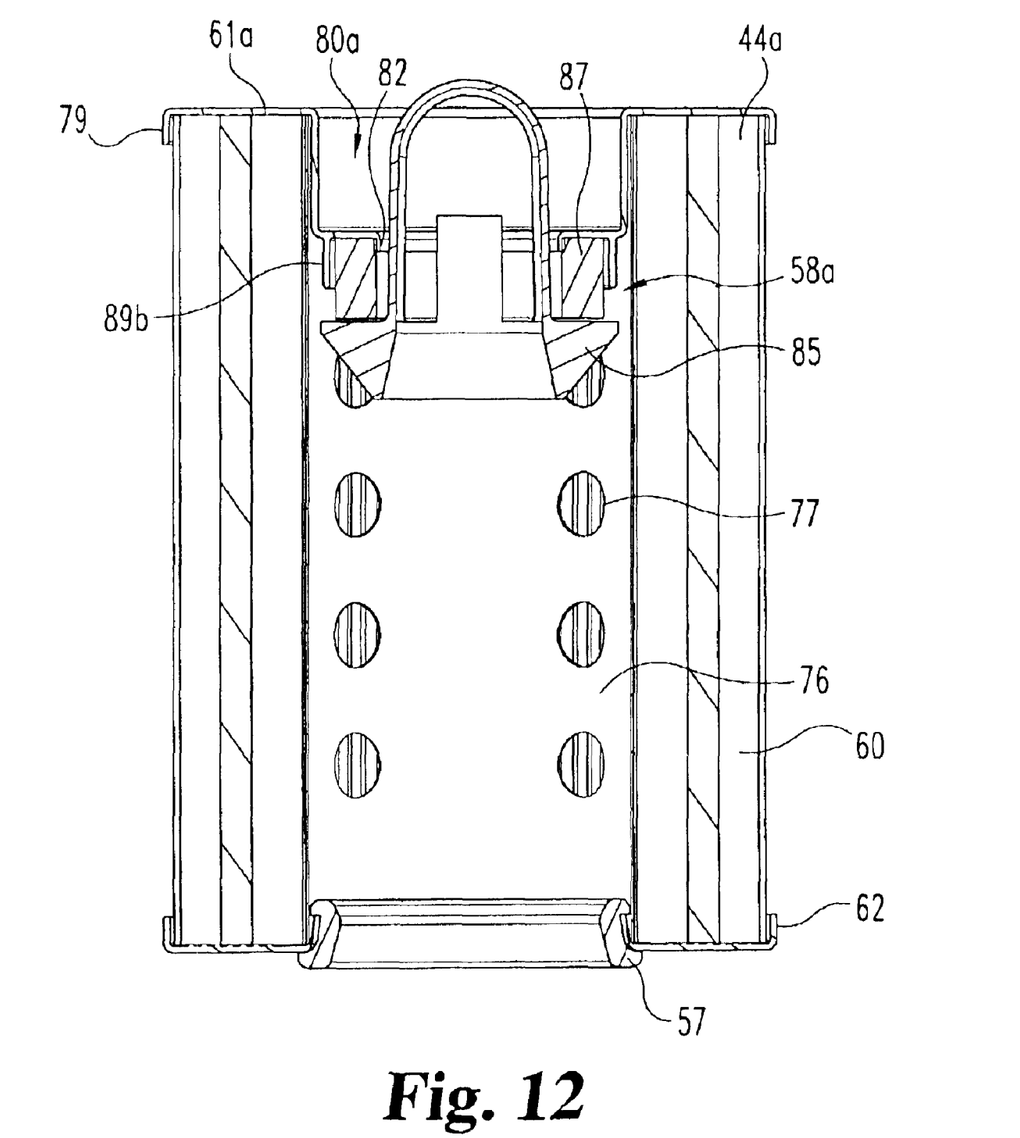
FIG. 12 is a cross sectional view of a filter cartridge that is incorporated in the FIG. 11 filter assembly.
Figure 13:
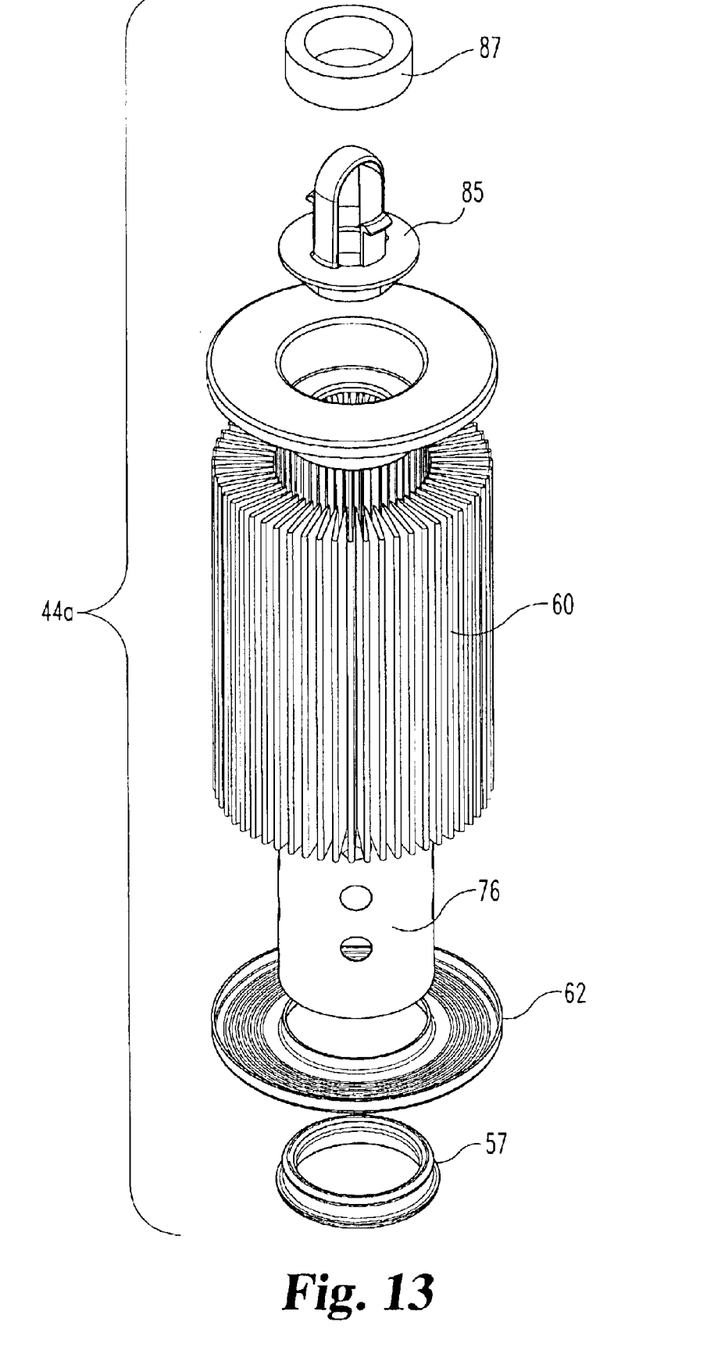
FIG. 13 is an exploded view of the FIG. 12 cartridge.

A filter assembly 30a according to another embodiment of the present invention is illustrated in FIGS. 11–13. Assembly 30a includes a filter head 32a, housing 33a, cap 34a, dual center post 40a, and filter cartridge 44a. The components in the filter assembly 30a are similar to the ones described above, with some of the exceptions noted below. The cap 34a in the illustrated embodiment incorporates an additive container 116, which is used to supply an additive to the fluid being filtered. For instance, when a fuel is being filtered, a fuel additive can be supplied via additive supply passage 117 from the container 116. The additive passage 117 is sized to control the delivery rate of the additive into the fluid. This eliminates the need for a valve to control the flow rate. As illustrated, collection bowl 35a is threadedly coupled to the filter head 32a. In the dual center post 40a, outer center post 42a defines outlet passages 108 through which filtered fluid flows. Inner center post 41a has a head portion 110a configured slightly different from the embodiment described above. As shown, head portion 110a includes an angled surface 113a and cylindrical surface 112a, which is positioned between angled surface 113a and reduced diameter portion 119.

As illustrated in FIGS. 12–13, the filter cartridge 44a includes fixed seal 57, a floating seal 58a, filter media 60, a first end plate 61a, second end plate 62, and center tube 76 with openings 77. The floating seal 58a and the first end plate 61a in this embodiment differ from ones in the embodiments described above. As can be seen in FIG. 12, the first end plate 61a has a central recess 80a that is deeper than the one illustrated in FIG. 3. Further, the first end plate 61a incorporates an outer support member 89b that resists expansion of the gasket 87. As shown, the outer support member 89b extends from the first end plate 61a and around the gasket 87. With the outer support member 89 being integrally formed in the first end plate 61a, construction of the filter cartridge 44a is simplified. As shown, the gasket is retained by the outer gasket retainer 89b and the inner flange 82 of the first end plate 61a.

Figure 14:
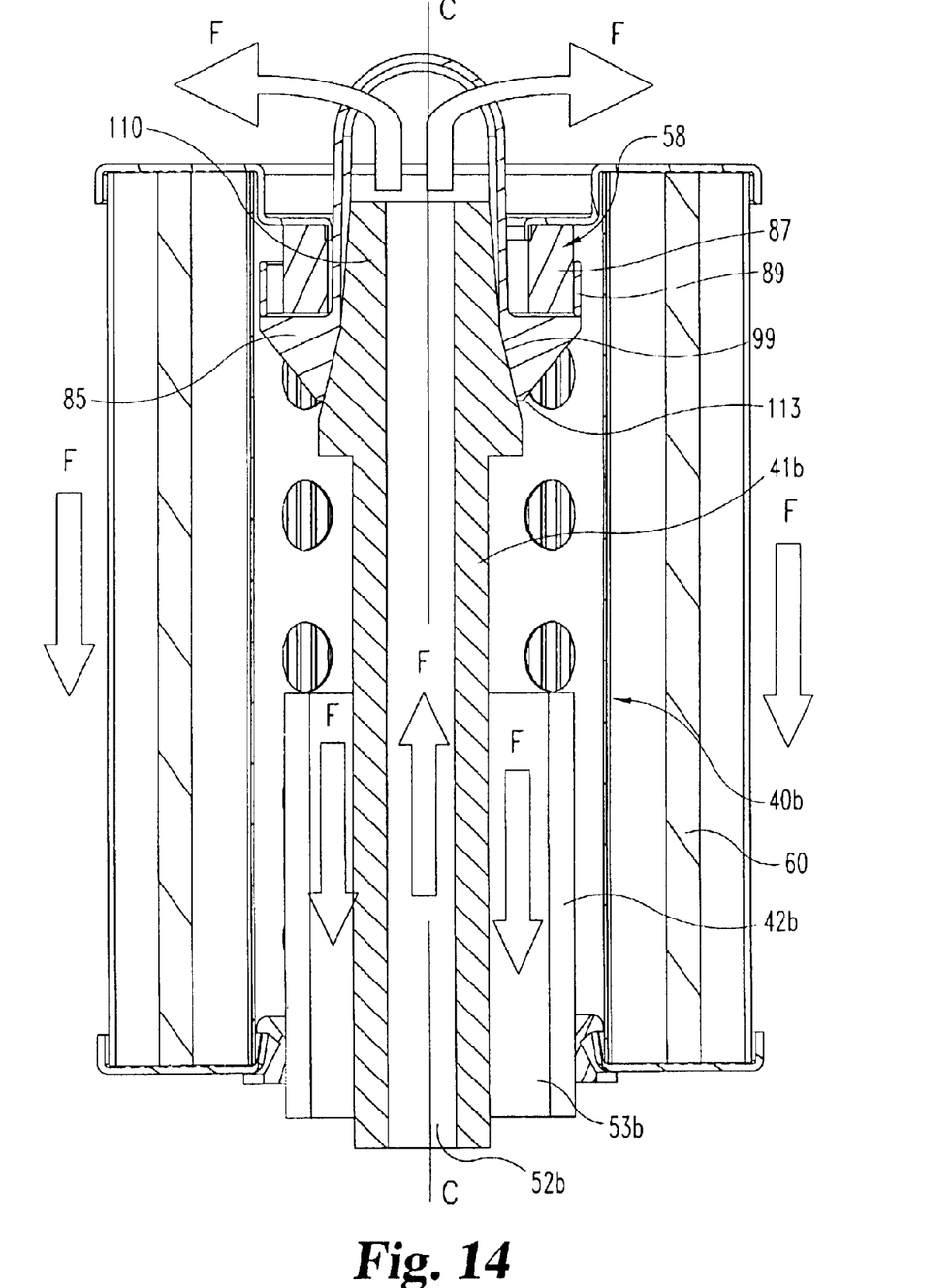
FIG. 14 is a cross sectional view of a filter cartridge assembly according to another embodiment of the present invention.

Referring to FIG. 14, the filter cartridge 44 according to the present invention can be installed into filter assemblies with center posts 40b that are designed offset from the central longitudinal axis C of the assembly. As illustrated, inner center post 41b is offset with respect to axis C, while outer center post 42b is aligned with the central longitudinal axis C. This offset center post construction can be used to increase the size of outer passage 53b, thereby increasing the overall flow rate in the filter assembly. Moreover, the offset center post construction can be used to ensure that the proper filter cartridge, only the ones with the floating seal, are installed in the filter assembly.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A filter assembly, comprising:

a post; and a filter cartridge received around said post, said filter cartridge including
a filter element to filter a fluid,
an end plate positioned at one end of said filter element, said end plate defining an opening, and
a floating seal assembly positioned proximal said opening in said end plate for forming a seal between said post and said end plate, said floating seal assembly including
a retainer sealing around said post, said retainer having a flange extending from said retainer, and
a gasket compressed by said flange against said end plate for sealing against said flange and said end plate, wherein said gasket and said retainer are separate components to permit relative movement for compensating for component misalignment.

2. A filter assembly, comprising:

a post; and a filter cartridge received around said post, said filter cartridge including
a filter element to filter a fluid,
an end plate positioned at one end of said filter element, said end plate defining an opening, and
a floating seal assembly positioned proximal said opening in said end plate for forming a seal between said post and said end plate, said floating seal assembly including
a retainer sealing around said post, said retainer having a flange extending from said retainer,
a gasket sealing against said flange and said end plate, and
a pair of retainer clips extending from said retainer to secure said retainer to said end plate.

3. The filter assembly of claim 2, wherein an outer distance between said pair of retainer clips is less than an inner diameter of said opening in said end plate for allowing said retainer to move with respect to said opening.

4. The filter assembly of claim 2, wherein said retainer has a handle member extending through said opening in said end plate.

5. The filter assembly of claim 1, further comprising a support member surrounding said gasket to resist expansion of said gasket.

6. The filter assembly of claim 5, wherein said support member is attached to said flange.

7. The filter assembly of claim 5, wherein said support member is attached to said end plate.

8. A filter assembly, comprising:

a post;

a filter cartridge received around said post, said filter cartridge including
a filter element to filter a fluid,
an end plate positioned at one end of said filter element, said end plate defining an opening, and
a floating seal assembly positioned proximal said opening in said end plate for forming a seal between said post and said end plate, said floating seal assembly including
a retainer sealing around said post, said retainer having a flange extending from said retainer, and
a gasket sealing against said flange and said end plate;

wherein said post has a head portion with a frustoconical shape;

wherein said retainer defines a post cavity in which said head of said post is received; and wherein said post cavity has a frustoconical shape.

9. The filter assembly of claim 1, further comprising a filter housing enclosing said filter cartridge.

10. The filter assembly of claim 9, wherein:

said filter housing has a cap; and said cap includes an additive container to supply an additive to the fluid.

11. The filter assembly of claim 9, wherein the filter housing includes a collection bowl.

12. The filter assembly of claim 1, wherein said post includes:

an inner post member defining an inner fluid passage; and an outer post member surrounding said inner post member, said inner post member and said outer post member defining an outer fluid passage.

13. The filter assembly of claim 12, wherein:

said filter cartridge includes a second end plate attached to said filter element;

said second end plate defines a second opening; and said filter cartridge includes a seal received in said second opening to seal between said second end plate and said outer post member.

14. The filter assembly of claim 1, wherein:

said filter cartridge includes a second end plate attached to the filter element;

said second end plate defines a second opening; and said filter cartridge includes a seal received in said second opening to seal between said second end plate and said post.

15. A filter cartridge, comprising:

a filter element to filter fluid, said filter element defining a post cavity constructed and arranged to receive a post, said filter element having a first end and a second end;

a first end plate attached to said first end of said filter element, said first end plate defining a first end plate opening;

a second end plate attached to said second end of said filter element, said second end plate defining a second end plate opening; and a floating seal assembly positioned proximal said first end plate opening to seal around the post, said floating seal assembly including a gasket, and a gasket retainer coupled to said first end plate, said gasket retainer defining a post opening in which the post is received, said gasket retainer having a flange to retain said gasket against said first end plate to seal around the post, wherein said gasket and said gasket retainer are separate components to permit floating of said gasket.

16. The filter cartridge of claim 15, a fixed seal received in said second end plate opening.

17. The filter cartridge of claim 15, wherein said gasket retainer has a clip coupling said gasket retainer to said first end plate.

18. The filter cartridge of claim 15, further comprising a support member positioned proximal said gasket to support said gasket.

19. The filter cartridge of claim 15, wherein said first end plate has a recessed portion surrounding said first end plate opening.

20. A floating seal assembly, comprising:

a retainer including a clip adapted to secure said retainer to an end plate of a filter cartridge, and a flange radially extending from said clip, said flange defining a post cavity adapted to seal around a post; and a gasket moveably disposed on said flange around said post opening to permit relative movement between said gasket and flange.

21. The floating seal assembly of claim 20, further comprising a support member surrounding said gasket to resist outward expansion of said gasket.

22. The floating seal assembly of claim 21, wherein said support member is attached to said flange.

23. The floating seal assembly of claim 20, further comprising a support rib attached to said flange for supporting said flange.

24. The floating seal assembly of claim 20, wherein said post cavity has a frustoconical shape.

25. The floating seal assembly of claim 20, further comprising a handle member attached to said flange.

* * * * *

UNITED STATES PATENT AND TRADEMARK OFFICE
CERTIFICATE OF CORRECTION

PATENT NO. : 6,902,669 B2
DATED : June 7, 2005
INVENTOR(S) : Jiang

It is certified that error appears in the above-identified patent and that said Letters Patent is hereby corrected as shown below:

Title page,
Item [56], References Cited, U.S. PATENT DOCUMENTS, please make a record of
-- 6,016,923   1/25/00   Baumann   210/440 --

Column 10,
Line 32, please change "gasket and flange." to -- gasket and said flange. --

Signed and Sealed this

Ninth Day of August, 2005

JON W. DUDAS
*Director of the United States Patent and Trademark Office*